March 3, 1942.  W. H. TEUSCHER  2,274,941
IMPLEMENT FOR GATHERING OBJECTS FROM THE SOIL
Filed March 29, 1940   2 Sheets-Sheet 2
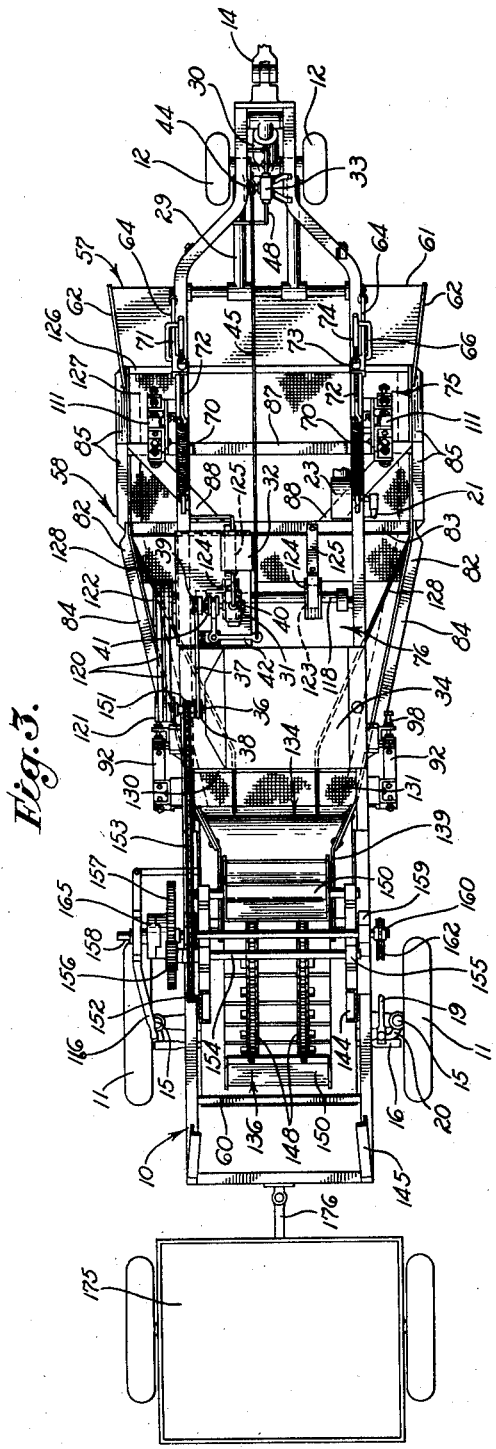
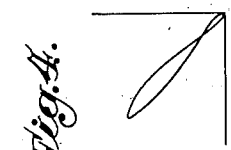
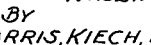
INVENTOR
WILLIAM H. TEUSCHER
BY
HARRIS, KIECH, FOSTER & HARRIS
ATTORNEYS Patented Mar. 3, 1942

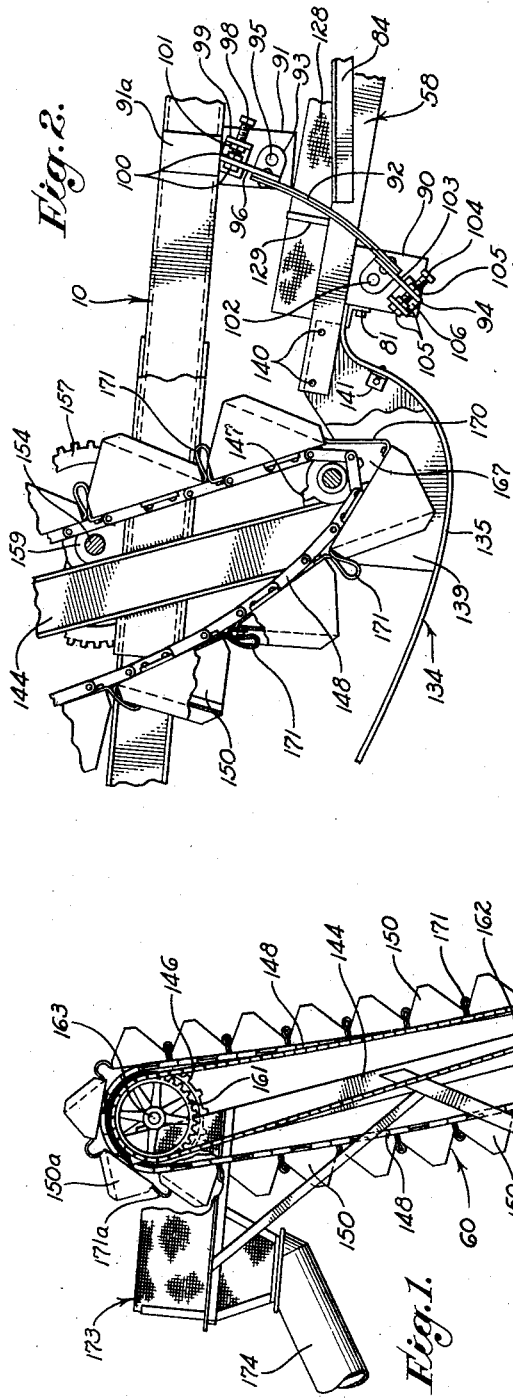

2,274,941

UNITED STATES PATENT OFFICE 2,274,941

IMPLEMENT FOR GATHERING OBJECTS FROM THE SOIL

William H. Teuscher, Claremont, Calif.

Application March 29, 1940, Serial No. 326,697

10 Claims. (Cl. 55—17)

My invention relates to both ground-working implements and to material-handling devices and refers especially to apparatus for removing rock and the like from soil. More particularly stated, my invention is directed to an implement that is movable over terrain and is adapted by power-driven mechanism to collect rock or harvest root crops from the soil traversed.

The general object of my invention is to provide an efficient mechanical object-picker that may be operated at relatively low cost and without necessity for any manual handling of materials whatsoever. A further general object in the preferred form of my invention is to make available an implement that may be drawn over terrain by a tractor for the dual purpose of automatically gathering objects such as rocks from the ground and automatically loading the objects into some suitable accompanying vehicle for transportation to some remote point.

An implement of the character indicated performs the operations of scooping earth and concomitant objects from the ground, separating the objects from the scooped earth, and finally elevating the isolated objects for discharge into some suitable receptacle for transportation. One of my specific objects is to incorporate in such an object-gathering vehicle means for sifting the scooped earth back to the ground. A further specific object is to separate the objects from the scooped earth by a screening process and simultaneously to carry the objects upward to feed a mechanical conveyor.

My invention is characterized by the concept that an inclined member or ramp may be vibrated or oscillated in such manner as to cause material thereon to progress towards the upper end thereof and the further concept that such an inclined member or ramp may be apertured to serve as a screen or classifier so that objects may be lifted gradually above ground level and simultaneously isolated from the scooped earth. Further objects of my invention are to provide an apertured ramp capable of performing these two functions simultaneously and to provide for a range of adjustments whereby the vibratory or oscillatory action of the ramp may be varied to handle various materials and to have various classifying effects.

The preferred form of my invention includes such a vibratory ramp in combination with an elevator adapted to lift the objects from the ramp to an elevated discharge level whereby the isolated objects may be transmitted to some suitable receptacle for transportation. One object in mind relating to this aspect of the invention is to design the elevator to receive material at a relatively low level on the implement vehicle to minimize the burden of lifting material that must be assumed by the inclined ramp. In attaining this object I have the more specific object of providing a relatively low conveyor boot without liability of damage by obstacles on the ground and of making such conveyor boot relatively shallow without danger of binding or jamming of the conveyor mechanism by material in the boot.

For the purpose of the present disclosure and to show by way of example the principles involved, I shall describe an embodiment of my invention designed for the specific task of gathering rocks from the soil. Those skilled in the art will readily appreciate how the same principles may be embodied in implements designed for other specific purposes such as harvesting potatoes or other root crops.

The above and other objects and advantages of my invention will be apparent in the detailed description to follow and the accompanying drawings.

In the drawings:

Fig. 1 is a side elevation of the preferred form of my invention, certain parts being broken away for clarity;

Fig. 2 is an enlarged portion of Fig. 1 showing the lower end of the rock elevator, parts being broken away for clarity;

Fig. 3 is a plan view of the implement vehicle with the elevator taken in horizontal section as indicated by the line 3—3 of Fig. 1; and Figs. 4 to 6 show diagrammatically the manner in which the ramp vibrates, the three figures depicting movement at three different points of a typical ramp.

The drawings show a vehicle frame generally designated 10 supported by a rear pair of wheels 11 and a front pair of wheels 12, and show the vehicle frame attached to a tractor 13 by coupling means 14. For steering the vehicle, the rear wheels 11 are mounted on steering knuckles 15 that are interconnected by a link 16. A rod 19 operatively interconnects an arm 20 on one of the steering knuckles 15 with an arm 21 on a shaft 22, the shaft being controlled by a worm mechanism (not shown) in a housing 23. The worm mechanism in the housing 23 is controlled in turn by a steering shaft 24 that carries a steering wheel 25 and that is embraced by a tubular support 26.

Since it is desirable in the operation of the implement that at least one end of the vehicle frame be adjustable in its spacing from the ground the two front wheels 12 may be mounted on an inclined wheel-frame or cradle 29, the angle of which is controlled by a hydraulic jack 30 of conventional construction. A hydraulic system for operating the hydraulic jack 30 may include a rotary pump 31, an oil reservoir 32, and a three-way control valve 33. The apparatus includes a prime mover 34 which may be an internal combustion engine with a drive shaft 36, and operative connections are provided for actuating the rotary pump 31 by the prime mover. In the particular construction shown in the drawings, a belt 37 interconnects a sheave 38 on the drive shaft 36 and a sheave 39 on a countershaft 40, and a clutch 41 controlled by a bell-crank 42 is mounted on the countershaft 40 to control operative connection of the countershaft with the rotary pump 31.

In my preferred arrangement the three-way control valve 33 has a control lever 44 that is operatively connected to the bell-crank 42 by a connecting rod 45. A feed pipe 47 extends from the oil reservoir 32 to the intake side of the rotary pump 31; a high pressure pipe 48 extends from the output side of the rotary pump to one port of the control valve 33; a low pressure return pipe 49 interconnects a second port of the control valve with the oil reservoir; a flexible conduit 50 extends from a third port of the control valve to the hydraulic jack 30; and a by-pass 51 interconnects the flexible conduit 50 and the return pipe 49. The by-pass 51 is controlled by a release valve 52 that is set to open at a predetermined pressure to avoid pumping excessive pressure into the hydraulic jack 30. It is contemplated that the control valve 33 will have a range of three positions, for example, a forward position placing the clutch 41 in engagement to operate the rotary pump 31 and placing the high pressure pipe 48 in communication with the conduit 50 through the valve, a neutral position with the clutch disengaged and the conduit 50 isolated to maintain the status pressure in the hydraulic jack, and a rearward position at which the clutch is still disengaged and at which the conduit 50 is placed in communication with the return pipe 49 through the valve to permit the hydraulic fluid to escape from the jack. By providing an auxiliary control lever 54 on the tractor 13 and providing a link 55 for loosely interconnecting the valve control lever 44 and the auxiliary control lever 54 I may arrange for control of the hydraulic jack 30 by an operator from his riding position on the tractor.

The principal operating parts of the rock-gathering mechanism used in the preferred form of my invention are a scraper or scoop 57, a vibratile ramp 58, and an elevator generally designated 60.

The scoop 57 has a bottom wall or scraper blade 61 and preferably includes two wings or side walls 62, the scoop being disposed to direct dislodged earth and rock onto the leading end of the ramp 58. The scoop 57 may be rigid relative to the vehicle frame 10, but I prefer to mount the scoop in a yielding or retractile manner to avoid damage when the scoop encounters an obstacle such as a deeply embedded boulder.

In the particular construction shown in the drawings, a lever 64 pivoted on a bracket 65 is mounted on each side of the vehicle frame 10 to swing within the limits of a guide bar 66. Below the pivot axis the lever 64 on each side of the vehicle frame is formed with two divergent arms 67 that are terminally attached to the scraper blade 61 and are interconnected by a reinforcing bar 68. It will be noted that the rear margin of the scraper blade 61 overlaps the leading end of the ramp 58 and that the pivotal suspension of the scoop is such that the scoop may swing to a retracted position above the ramp. To limit the retraction of the scoop a chain 69 may be provided on each side of the vehicle frame 10 interconnecting the vehicle frame and one of the side walls 62 of the scoop.

The means to maintain the scoop yieldingly in its normal or advanced disposition may comprise two helical springs 70, one on each side of the vehicle frame acting between the vehicle frame and an upper arm 71 of the corresponding lever 64. The lower end of each spring 70 is connected directly to the vehicle frame 10 and the upper end of the spring is connected to a threaded rod 72 that extends through a suitable aperture in the lever arm 71. The threaded rod 72 carries a nut 73 abutting against the arm 71 in opposition to tension of the spring 70 and for convenience in adjusting the tension of the spring the nut 73 is integral with a suitable crank 74.

The ramp 58 may be of any suitable construction and may be mounted in any manner that permits the required vibration or oscillation. Preferably, as in the construction to be described, the ramp is mounted in what may be termed a floating manner since it has neither a fixed pivot nor any guide means confining its movement to any predetermined path.

The ramp 58 shown in Figs. 1 and 3 is an angle-iron frame including a rectangular panel 75 at its lower end and an upper panel 76 that narrows towards the elevator 60, the frame of the ramp being reinforced from below by a lateral channel-iron 79 and two lateral angle-irons 80 and 81. Attached to each side of the ramp 58 at the juncture of the two frame panels 75 and 76 is a triangular upwardly extending plate 82, the two plates being interconnected by a transverse angle-iron 83 and being reinforced individually by angle-irons 84. At each side of the lower panel 75 of the ramp a pair of upwardly inclined angle-iron members 85 converge to support a second transverse angle-iron 87 and for further rigidity of the assemblage the two transverse angle-irons 83 and 87 are interconnected by diagonal brace members 88.

For the purpose of floatingly suspending the upper and rear end of the ramp 58 from the vehicle frame, an angular plate 90 is mounted on each side of the ramp as best shown in Fig. 2 and a corresponding angular plate 91 in substantially the same plane is mounted on each side of the vehicle frame 10. For reinforcement, the plate 91 may be braced by an inclined plate 91a. On each side of the apparatus a two-ply leaf spring 92 is connected at its upper end to a clip 93 on the upper angular plate 91 and is connected at its lower end to a similar clip 94 on the lower plate 90. The clip 93 is mounted on a pivot 95 and is of angular configuration, being formed with an arm 96. The position of the arm 96 and thereby the rotative position of the clip 93 is determined by a cap screw 98 mounted in a fixed clip 99 on the face of the plate 91, the cap screw carrying two nuts 100 on opposite sides of the arm 96 and a third nut 101 abutting the fixed clip 99. In like manner the clip 94 on the lower plate 90 is mounted on a pivot 102 and has a downwardly extending arm 103 controlled by a cap screw 104, the cap screw carrying nuts 105 abutting against the arm 103 and against a fixed clip 106 in which the cap screw is mounted.

For the purpose of flexibly connecting the forward and lower end of the ramp 58 to the vehicle frame 10, a plate 109 is mounted on each side of the vehicle frame and a corresponding plate 110 is mounted on the transverse angle-iron 87 of the ramp. In the same manner as at the rear end of the ramp, a two-ply leaf spring 111 on each side of the vehicle frame is connected to a clip 112 pivotally mounted on the upper plate 109 and is connected at its lower end to a second clip 113 pivotally mounted on the lower plate 110. The upper clip 112 is held at adjusted positions by a cap screw 114 in a fixed clip 115 and the lower clip 113 is controlled in a similar manner by a cap screw 116 that adjustably interconnects the clip 113 with one of the diagonal brace members 88.

While any suitable type of driver may be employed to vibrate the ramp 58, I prefer to employ a construction that includes a crank shaft 118 (Fig. 3) mounted in bearings 119 (Fig. 1) on the vehicle frame 10, the crank shaft being driven by a pair of belts 120 extending from a sheave 121 on the drive shaft 36 to a second sheave 122 on the crank shaft. Mounted on the crank shaft 118 in a rotatably adjustable manner are two spaced eccentrics 123 that are in turn rotatably embraced by complementary rings 124. Each of the rings 124 is operatively connected to the ramp 58 by a pair of flexible bars 125 that are riveted to the transverse angle-iron 83 of the ramp. It is apparent that rotation of the crank shaft 118 will cause the ramp 58 to vibrate or oscillate and that the amplitude of such movement on the part of the ramp will be determined by the rotational adjustment of the eccentrics 123 relative to the throw of the crank shaft 118.

The leading margin of the ramp 58 immediately adjacent the scoop 57 is provided with a solid plate 126 to keep the scooped material from sifting through the leading portion of the ramp and accumulating thereunder to interfere with vibratory motion of the ramp. The major portion of the lower rectangular panel 75, however, is spanned by a coarse mesh screen 127, a one and one-eighth inch mesh screen being suitable for most operations. The upper panel 76 of the ramp may present a solid surface, preferably being covered by some fibrous material such as wood to avoid highly polished surfaces that might destroy the effectiveness of the ramp in its material-raising function. Since the upper panel 76 of the ramp narrows towards the elevator 60, it is advisable to provide side walls or barriers 128 which may consist of strips of screen held upright by spaced bars 129.

At the upper end of the ramp 58 the upper panel 76 provides a transverse opening 130 of substantial dimensions, which is spanned by a replaceable screen 131. The purpose of this replaceable screen is to release to the ground any rocks remaining on the ramp of smaller size than it is desired to deliver to the elevator 60 and the mesh of the replaceable screen may be the same as the mesh of the screen in the lower panel 75 or may be of larger mesh. By making the screen 131 detachable it is possible for the operator of the apparatus to change conveniently from one size mesh to another according to the classification of rock it is desired to gather from the particular terrain.

It will be noted that the elevator 60 has a relatively low and relatively shallow boot generally designated 134, the low feeding level of the boot making it unnecessary for the vibratory ramp 58 to raise the gathered rocks any great distance above ground level. One feature of my invention is the conception that such a boot may extend relatively close to the ground level if the boot has a flexible bottom wall 135, for example, a bottom wall fabricated from heavy woven material commonly employed for belting. The front end of the sheet of material comprising the bottom wall 135 is anchored to the upper end of the ramp 58 by the previously mentioned angle-iron 81 and the rear end of the flexible sheet is attached to a transverse angle-iron 136 that is yieldingly connected to the vehicle frame 10 in a manner to permit the flexible sheet to yield longitudinally. In the particular construction shown, the transverse angle-iron 136 rides on a pair of diagonal angles 137 of the vehicle frame and is connected to the diagonal angles by a pair of helical springs 138. The boot is completed by a pair of side walls 139, which also may be of flexible material, the side walls being shown attached to the ramp 58 by rivets 140 and attached to the bottom wall 135 of the boot by suitable clips 141. The virtue of an elevator boot constructed in the manner described is that it will yield without damage to any obstacle encountered on the ground such as a large rock, and, on the other hand, it will yield downwardly if any material is jammed between the bottom of the boot and the elevator mechanism in the boot.

The moving parts of the elevator mechanism are carried by an upwardly extending elevator frame 144 that is mounted on the rear of the vehicle frame 10 and braced by diagonal members 145. Included in the conveyor mechanism are a pair of head wheels 146, a pair of foot wheels 147, both being sprocket wheels, a pair of continuous chains 148 operated by the two pairs of wheels, and a plurality of conveyor buckets 150 mounted on the two pairs of chains. To actuate the conveyor mechanism the drive shaft 36 of the prime mover 34 carries a sprocket 151 that is connected with a larger sprocket 152 on the elevator frame by a sprocket chain 153. A shaft 154 on which the sprocket 152 is mounted extends through a pair of bearings 155 and carries a pinion 156 in mesh with a large gear 157 on a shaft 158. The shaft 158, which is journaled in a pair of bearings 159, drives a small sprocket 160 that in turn drives a large sprocket 161 at the top of the elevator frame 144 through the medium of a sprocket chain 162. The large sprocket 161 at the top of the elevator and the two head wheels 146 are mounted on a common shaft 163. To control the operative connection between the engine 34 and the elevator mechanism, some suitable clutch may be provided, for example, a clutch 165 effective between the gear 157 and the shaft 158, the clutch being operated by a lever 166.

As previously indicated, the elevator boot 134 must be shallow as well as low to minimize the burden of lifting material that is imposed on the ramp 58. It is to be noted as an important feature of my invention that the foot wheels 147 are small in diameter and that the rocks are fed into the elevator boot at a level as low as the axis of the relatively small foot wheels. It has not heretofore been regarded as feasible to combine the described type of elevator mechanism with small foot wheels and shallow boot because in the operation of such a combination, material tends to become trapped back of the buckets with damaging effect as the buckets are carried around the foot wheels.

The manner in which material tends to be trapped may be understood by referring to Fig. 2, which reveals that the conveyor buckets 150 are carried by every third link of the conveyor chains 148. Throughout the major portion of the closed path traversed by one of the conveyor buckets, the back of the conveyor bucket lies snug against the conveyor chain 148, but as the bucket changes direction upon reaching the foot wheels 147 the back of the bucket diverges from the link ahead of the link upon which the bucket is mounted, thereby forming a space 167 in which material in the elevator boot may enter. It is apparent that as the bucket subsequently leaves the foot wheels 147 the back of the bucket closes against the conveyor chains to eliminate this space 167 and that any material trapped back of the bucket at such time might cause damage, especially if the material is a rock of substantial size. Lagging slightly behind the formation of such a space 167 in front of each conveyor bucket as the bucket passes around the foot wheels 147 is the formation of a second similar space between the back of the bucket and the link immediately following the link on which the bucket is mounted.

In my invention, any tendency of material to be trapped between the conveyor buckets and the conveyor chains in the elevator boot is precluded by flexible webs or aprons 170 that interconnect each pair of successive conveyor buckets 150. As indicated in Fig. 2, whenever a space 167 forms back of a bucket, a corresponding apron 170 stretches out to keep material from entering the same. As the buckets 150 return to normal relation to each other on the upward run of the conveyor chain 148, the aprons 170 loop outwardly.

As the conveyor buckets pass over the head wheels 146, the buckets again diverge from the conveyor chains but the divergence is not as great as the divergence of the buckets at the foot wheels because the head wheels are relatively large in diameter. At the top of the conveyor, then, the apron loops 171 merely open slightly. The conveyor buckets, of course, discharge their material as they tilt backward in passing over the head wheels 146 and at such time some of the discharged material strikes the apron loops and is deflected outward. In Fig. 1, for example, material discharged from the conveyor bucket 150a striking the apron loop 171a will thereby be deflected outward to the rear of the conveyor mechanism.

In the preferred form of my invention I mount a hopper 173 on the elevator 60, the particular hopper shown in the drawings having walls of screen material and having a swiveled discharge spout 174. The discharge spout 174 may be directed laterally to deliver the rocks to some vehicle such as a truck that accompanies the rock-gathering apparatus for the purpose of receiving the rock and hauling the rock to some remote dumping ground. In another mode of operation the swiveled spout 174 may be turned rearward as indicated in Fig. 1 to dump into a rock receptacle in the form of a trailer 175 indicated in Fig. 3, the trailer being coupled to the rear of the rock-gathering apparatus by a suitable draft bar 176.

The operation of my invention will be readily understood from the foregoing description. As the apparatus is drawn forward over the terrain by the tractor 13, the scoop 61 dislodges rock and earth from the ground and causes the dislodged rock and earth to flow onto the lower leading end of the ramp 58. The movement of material from the scoop to the lower end of the ramp crowds or displaces material on the ramp rearward and upward and is an important factor in the lifting of the rocks above ground level. Most of the soil immediately drops through the screen 127 spanning the lower panel 75 of the ramp so that the crowding of the scooped soil is not effective over the upper panel 76 of the ramp and the vibration of the ramp must be depended upon to cause the rock to progress upward over the upper panel into the elevator boot 134. As the rocks approach the upper end of the ramp, any relatively small rocks that might have been carried over the screen at the lower end of the ramp by the action of the moving soil now drop through the screen 131 at the top of the ramp so that only rocks above a predetermined size eventually reach the elevator boot 134. The rocks that enter the elevator boot are picked up by the elevator buckets and carried upward into the elevated hopper 173 and then are discharged through the swiveled spout 174 into whatever rock receptacle is provided.

The vibration of the ramp 58 is such as to achieve three distinct effects: the sifting of earth away from the rock, the dislodgment of rocks, sticks, brush, and other obstacles tending to clog the screen on the ramp, and the transportation of the isolated rock up the ramp into the elevator boot 134.

To cause material to progress up the inclined surface of the ramp by vibration of the ramp, it is essential that the vibratory movement of the ramp have a vertical component as well as a horizontal component, the resultant path of vibration being inclined from the vertical in the same direction as the ramp is inclined from the vertical. It will be noted that the four sets of two-ply leaf springs by means of which the ramp is suspended from the vehicle frame are inclined upward and forward. Factors that may be mentioned as entering into the conveyor effect of the ramp on material supported thereon include the speed or frequency of vibration as determined by the angular velocity of the crank shaft 118, the amplitude of the vibration as determined by the "throw" to which the eccentrics 123 are adjusted, the lengths of the two-ply leaf springs by which the ramp is suspended, the inclination of the two-ply leaf springs, the elasticity of the two-ply leaf springs, the points of the two-ply leaf springs at which force is exerted to place the leaf springs under flexure, and the degree to which the springs are flexed by adjustment of the various cap screws associated with the leaf springs.

The disclosed arrangement is extremely flexible in that it may be adjusted to meet widely divergent conditions. I have discovered that one adjustment of the above enumerated factors is necessary for gathering relatively small rocks from one soil, but that an entirely different adjustment may be necessary for gathering relatively large rocks from another area. It is not necessary, however, to make any exhaustive study of the various factors involved because adjustment for any particular operating condition may be made by trial and error in a relatively short time, the operator making various adjustments relative to the speed of the crank, the throw of the eccentrics, and the flexures of the two-ply leaf springs until he notes the desired conveying effect on the material that is delivered to the ramp by the scoop. The degree to which the vibratory action may be adjusted for selective effect is such that rocks of large diameter will linger indefinitely on the lower panel of the ramp while relatively small rocks stream up the ramp and into the elevator boot.

In one particular instance I adjusted an apparatus such as shown in the drawings to have the desired conveyor effect on rocks that averaged between two and three inches in diameter gathered from a rather sandy field, and then obtained curves to indicate the character of the vibratory movement at various points of the ramp. One pencil pointing outwardly to one side of the ramp was fastened to the ramp at an upper point indicated at 4 in Fig. 1 and while the ramp was in motion with the vehicle frame stationary, a piece of paper was held vertically against the pencil to produce the curve shown in Fig. 4. A second pencil in like manner was mounted at the point indicated 5 in Fig. 1 where the eccentrics are connected to the ramp and the same procedure was followed to produce the curve shown in Fig. 5. The last curve shown in Fig. 6 was produced by fastening a pencil to the lower end of the ramp at the point indicated by numeral 6 in Fig. 1. The approximate magnitude of the vibratory motion may be indicated by stating that in each of Figs. 4, 5, and 6 the vertical component represented is approximately one inch.

The preferred form of my invention described in specific detail herein will suggest to those skilled in the art various changes, modifications, and substitutions that may be made without departing from the underlying principles of my concept, and I reserve the right to all such changes, modifications, and substitutions that properly come within the scope of my appended claims.

I claim as my invention:

1. An apparatus of the character described for gathering objects from the soil, including in combination: a main frame adapted for movement over terrain; a ramp movably carried by said frame; means adapted to dislodge material from the ground as said main frame moves over terrain and to deposit the dislodged material on the lower end of said ramp; means to cause said ramp to vibrate with both a vertical component and a horizontal component to cause material thereon to progress towards the upper end thereof; an elevator boot positioned to receive material from the upper end of said ramp, said boot extending downwardly from the upper end of the ramp towards ground level and having a flexible bottom wall to yield when moved against protruding obstacles on the ground; and elevator means to convey material from said boot to an upper discharge level.

2. An apparatus of the character described for gathering objects from the soil, including in combination: a main frame adapted for movement over terrain; a ramp movably carried by said frame; means adapted to dislodge material from the ground as said main frame moves over terrain and to deposit the dislodged material on the lower end of said ramp; means to cause said ramp to vibrate with both a vertical component and a horizontal component to cause material thereon to progress towards the upper end thereof; an elevator boot positioned to receive material from the upper end of said ramp, said boot extending downwardly from the upper end of the ramp towards ground level and having a flexible bottom wall to yield when moved against protruding obstacles on the ground; a plurality of elevator buckets adapted to carry material from said conveyor boot to an elevated discharge level; and a plurality of flexible aprons, each apron interconnecting two adjacent buckets of said series of buckets to keep material from behind the buckets as the buckets move through the interior of said boot.

3. An apparatus of the character described for gathering objects from the soil, including in combination: a main frame adapted for movement over terrain; a ramp movably carried by said frame; means adapted to dislodge material from the ground as said main frame moves over terrain and to deposit the dislodged material on the lower end of said ramp; means to cause material on said ramp to progress towards the upper end thereof; screen means to permit the dislodged earth to separate from the dislodged objects and drop back to the ground as said main frame traverses the terrain; a relatively shallow elevator boot positioned to receive material from the upper end of said ramp; a foot conveyor-wheel of relatively small diameter in said boot; a head conveyor-wheel at a discharge level above said boot; a continuous flexible conveyor member interconnecting said wheels; a plurality of conveyor buckets mounted on said continuous flexible means; and a plurality of flexible aprons, each apron interconnecting two adjacent buckets of said plurality of buckets to prevent material in said boot from entering spaces between said buckets and said continuous flexible means formed when said buckets pass around said foot wheel.

4. An apparatus of the character described for gathering objects from the soil, including in combination: a main frame adapted for movement over terrain; a ramp movably carried by said frame; means adapted to dislodge material from the ground as said main frame moves over terrain and to deposit the dislodged material on the lower end of said ramp; means to cause material on said ramp to progress towards the upper end thereof; screen means to permit the dislodged earth to separate from the dislodged objects and drop back to the ground as said main frame traverses the terrain; a relatively shallow elevator boot positioned to receive material from the upper end of said ramp, said boot having a flexible bottom wall to yield when moved against protruding obstacles on the ground; a foot conveyor-wheel of relatively small diameter in said boot; a head conveyor-wheel at a discharge level above said boot; a continuous conveyor-chain interconnecting said wheels; a plurality of conveyor buckets mounted on spaced links of said conveyor-chain; and a plurality of flexible aprons, each apron interconnecting two adjacent buckets of said plurality of buckets to prevent material in said boot from entering spaces between said buckets and said continuous conveyor-chain formed when said buckets pass around said foot wheel.

5. An elevator including in combination: an elevator boot having a yieldingly supported flexible bottom wall; a foot wheel in said boot; a head wheel spaced above the boot; a continuous flexible conveyor member interconnecting said two wheels; a plurality of conveyor buckets mounted on said conveyor member; and flexible aprons interconnecting said plurality of buckets, said flexible aprons being adapted to extend as barriers between the buckets as the buckets pass around said foot wheel to prevent material in said boot from entering spaces between said buckets and said conveyor member.

6. An apparatus of the class described for gathering objects from the soil including in combination: a vehicle adapted for movement over terrain; a ramp movably carried by said vehicle; means adapted to dislodge objects and earth from the ground as said vehicle moves over the terrain and to shift the dislodged objects onto the lower portion of said ramp; power means to reciprocate said ramp with both a vertical component and a horizontal component at a rapid vibratory rate independently of the rate of travel of the vehicle to cause the material on the ramp to progress towards the upper end thereof; and means to receive objects from said ramp.

7. An apparatus of the class described for gathering objects from the soil including in combination: a vehicle adapted for movement over terrain; a ramp; means adapted to dislodge objects from the ground as said vehicle moves over the terrain and to shift the dislodged objects onto the lower portion of said ramp; means including yielding members movably supporting said ramp on said vehicle; power means for vibratory actuation carried by said vehicle; means operatively connecting said power means with said ramp to cause said ramp to reciprocate with both a vertical component and a horizontal component at a vibratory rate to cause material thereon to progress towards the upper end thereof; and means to stress said yielding means, said operatively connecting means being adjustable to vary the range of reciprocation of the ramp and said stressing means being adjustable to vary the character of the cyclic path of reciprocation thereby to cause the vibration of the ramp to favor travel thereover of objects of selected sizes and weights and to retard travel thereover of objects of different sizes and weights.

8. An apparatus of the class described for gathering objects from the soil including in combination: a vehicle adapted for movement over terrain; a ramp; means adapted to dislodge objects from the ground as said vehicle moves over the terrain and to shift the dislodged objects onto the lower portion of said ramp; means including flexible members movably supporting said ramp on said vehicle; power means for vibratory actuation carried by said vehicle; means operatively connecting said power means with said ramp to cause said ramp to reciprocate with both a vertical component and a horizontal component at a vibratory rate to cause material thereon to progress towards the upper end thereof; and means to flex said flexible members, said operatively connecting means being adjustable to vary the range of reciprocation of the ramp and said means to flex said members being adjustable to vary the character of the cyclic path of reciprocation of the ramp thereby to cause the vibration of the ramp to favor travel thereover of objects of selected sizes and weights and to retard the travel thereover of objects of different sizes and weights.

9. An apparatus of the class described for gathering objects from the soil including in combination: a vehicle adapted for movement over terrain; a ramp; leaf-springs movably supporting said ramp on said vehicle; means adapted to dislodge objects and earth from the ground as said vehicle moves over the terrain and to shift the dislodged objects onto the lower portion of said ramp; an adjustable eccentric operatively connected to said ramp to cause said ramp to reciprocate at a vibratory rate with both a vertical component and a horizontal component to cause material on the ramp to progress towards the upper end thereof; power means carried by said vehicle to actuate said eccentric; adjustable means operatively connected to said leaf-springs to variably flex the springs thereby to vary the character of the cyclic path of reciprocation of the ramp; and means to receive objects from the upper end of said ramp.

10. An apparatus of the class described for gathering objects from the soil including in combination: a vehicle adapted for movement over terrain; a ramp; means movably supporting said ramp on said vehicle from one point of the ramp; a flexible arm supporting said ramp on said frame at another point of the ramp; a pivoted anchorage for one end of said arm; means to adjust the rotational disposition of said pivoted anchorage to variably stress said arm; means adapted to dislodge objects from the ground when said vehicle frame moves over the terrain and to shift the dislodged objects onto the lower portion of said ramp; power means for vibratory actuation carried by said vehicle; means operatively connecting said power means with said ramp to cause said ramp to reciprocate with both a vertical component and a horizontal component at a vibratory rate to cause material thereon to progress towards the upper end thereof, said operatively connecting means being adjustable to vary the range of said reciprocation; and means to receive objects from the upper end of said ramp.

WILLIAM H. TEUSCHER.